(12) United States Patent
Jarvis et al.

(10) Patent No.: US 9,236,649 B2
(45) Date of Patent: Jan. 12, 2016

(54) MODULAR STRUCTURAL STIFFENERS

(71) Applicant: Apple Inc., Cupertino, CA (US)

(72) Inventors: Daniel W. Jarvis, Sunnyvale, CA (US); Miguel C. Christophy, San Francisco, CA (US); Richard Hung Minh Dinh, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 175 days.

(21) Appl. No.: 14/023,364

(22) Filed: Sep. 10, 2013

(65) Prior Publication Data

US 2014/0361669 A1    Dec. 11, 2014

Related U.S. Application Data

(60) Provisional application No. 61/832,704, filed on Jun. 7, 2013.

(51) Int. Cl.
*H01Q 1/24* (2006.01)
*G06F 1/16* (2006.01)
*H04M 1/02* (2006.01)
*H04M 1/18* (2006.01)

(52) U.S. Cl.
CPC .............. *H01Q 1/24* (2013.01); *G06F 1/1613* (2013.01); *H04M 1/0202* (2013.01); *H04M 1/0249* (2013.01); *H04M 1/185* (2013.01); *Y10T 29/49002* (2015.01); *Y10T 29/49861* (2015.01)

(58) Field of Classification Search
CPC ............................ H04M 1/0202; H04M 1/026
USPC ................. 312/223.1, 223.2; 361/679.56
See application file for complete search history.

(56) References Cited

U.S. PATENT DOCUMENTS

| | | | |
|---|---|---|---|
| 3,504,772 A * | 4/1970 | Barry | 190/105 |
| 2007/0164022 A1 | 7/2007 | Seo et al. | |
| 2008/0146293 A1 | 6/2008 | Kim | |
| 2009/0005132 A1 | 1/2009 | Ogatsu | |
| 2010/0061044 A1* | 3/2010 | Zou et al. | 361/679.01 |
| 2010/0264786 A1* | 10/2010 | Cheng | 312/223.1 |
| 2011/0041316 A1 | 2/2011 | Chen et al. | |
| 2011/0287812 A1 | 11/2011 | Joo | |

FOREIGN PATENT DOCUMENTS

| | | |
|---|---|---|
| KR | 100673957 | 1/2007 |
| KR | 100810266 | 3/2008 |
| KR | 1020110127483 | 11/2011 |

OTHER PUBLICATIONS

PCT Application No. PCT/US2014/033139—International Search Report & Written Opinion dated Jul. 18, 2014.

* cited by examiner

*Primary Examiner* — Matthew Ing
(74) *Attorney, Agent, or Firm* — Downey Brand LLP

(57) ABSTRACT

A housing for a personal electronic device is described herein. The housing may include at least structural member configured to be arranged within an internal cavity of the housing. The at least structural member is aligned with a feature external to the housing. The at least one structural member is affixed to an interior surface of the internal cavity. Furthermore, the at least structural member and housing are co-machined to define a coaxial aperture for accepting the feature.

20 Claims, 9 Drawing Sheets

MODULAR STRUCTURAL STIFFENERS

CROSS-REFERENCE TO RELATED APPLICATIONS

This application claims priority under 35 U.S.C. 119(e) to U.S. Provisional Patent Application No. 61/832,704, filed Jun. 7, 2013 and entitled "MODULAR STRUCTURAL STIFFENERS" by Jarvis which is incorporated herein by reference in its entirety and for all purposes.

FIELD OF THE DESCRIBED EMBODIMENTS

The described embodiments relate generally to personal electronic devices and more particularly to internal structural members of the same.

BACKGROUND

Generally, personal electronic devices take a plurality of forms and are manufactured using available materials which provide a balance of durability and function. Many electronic devices include a plurality of internal components that are assembled into a functional unit to which a housing is "snapped" over. For example, devices having plastic housings or covers are typically formed as standalone devices absent a housing, and after testing and/or inspection, have a flexible or relatively flexible plastic housing applied thereon.

However, if several external features such as buttons, switches, or the like are part of the device's design, application of the housing after external feature assembly can cause damage to the edges of the housing (e.g., while snapping the housing over buttons), cosmetic defects (e.g., deflection, discoloration, and/or chipping of decorations/cosmetic surfaces), and in some cases breaking of the housing or external features.

Therefore, what is desired are innovations in device structures and assembly methodologies which overcome these and other drawbacks.

SUMMARY OF THE DESCRIBED EMBODIMENTS

This paper describes various embodiments that relate to personal electronic devices. More particularly, methods, apparatuses, and systems are described which provide internal structural stiffeners for personal electronic devices.

According to an exemplary embodiment, a housing for a personal electronic device is disclosed. The housing may include at least structural member configured to be arranged within an internal cavity of the housing. The at least structural member is aligned with a feature external to the housing. The at least one structural member is affixed to an interior surface of the internal cavity. Furthermore, the at least structural member and housing are co-machined to define a coaxial aperture for accepting the feature.

According to another exemplary embodiment, a system of structural stiffeners for a personal electronic device is disclosed. The system comprises a substantially planar chassis configured to be arranged within an internal cavity of a housing and a structural stiffener configured to be arranged within the internal cavity about a periphery of the chassis. The structural stiffener is further configured to be aligned with a feature external to the housing. Furthermore, the structural stiffener and housing are co-machined to define a coaxial aperture for accepting the feature.

According to yet another exemplary embodiment, a method of assembling a personal electronic device is disclosed. The method can include forming a housing having an internal cavity defined therein and aligning, inserting, and affixing at least structural stiffener within the internal cavity of the housing. The at least one structural stiffener is aligned with a feature external to the housing and the at least one structural stiffener is affixed to an interior surface of the internal cavity. The method further includes co-machining the housing and the at least one structural stiffener to define a coaxial aperture for accepting the feature.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION OF SELECTED EMBODIMENTS

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The described embodiments relate generally to personal electronic devices and more particularly to internal structural members and subassemblies of the same. According to exemplary embodiments, internal structural members of a personal electronic device may be divided into structural and/or functional subassemblies that are assembled into a housing cavity, rather than the alternative. By assembling subassemblies into the housing cavity, stress on housings made from less rigid materials (e.g., plastic) may be reduced, resulting in better cosmetic qualities than conventional assembly methodologies. Furthermore, by assembling subassemblies into the housing, exacting tolerances may be maintained through adjustable joints which allow alignment of individual subassemblies according to external features of the housing (e.g., button features, switch features, charging port features, etc.) and also allow alignment between adjacent subassemblies. After installation of the subassemblies into the housing, both may be "co-machined" or simultaneously machined to create apertures for installation of external features such as switches, buttons, ports, and the like.

According to at least one exemplary embodiment, a device housing is formed of plastic and an associated structural stiffener is formed of metal. Both the device housing and the structural stiffener may be machined at relatively the same time in order to define apertures. The apertures may be finished through installation of trim and/or metal plating. Subsequently, external features such as switched, buttons, ports, and the like may be installed through the finished apertures. Hereinafter exemplary embodiments of the present invention are described in detail.

Figure 1A:
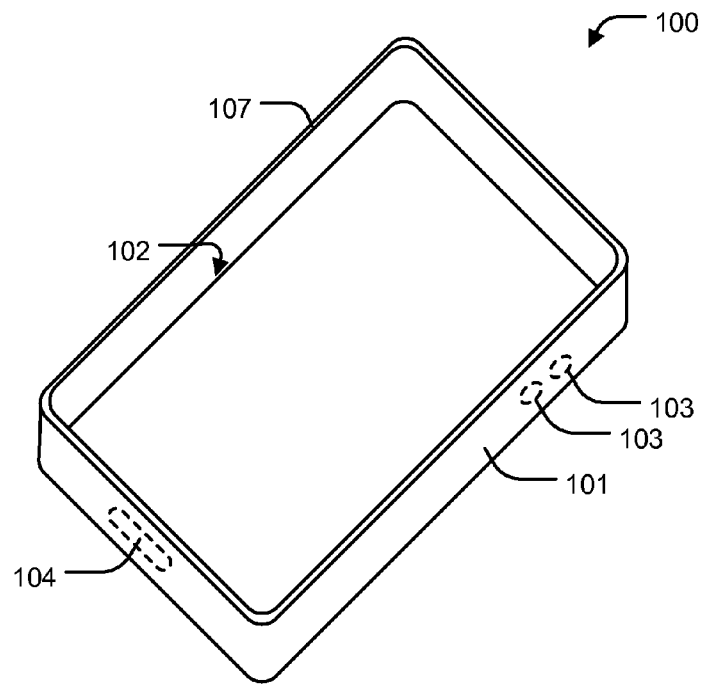
FIG. 1A is a perspective view of a housing for a personal electronic device, according to an exemplary embodiment.

FIG. 1A is a perspective view of a housing 100 for a personal electronic device, according to an exemplary embodiment. The housing 100 may be a housing for a cellular telephone, media player, tablet computer, or any other personal electronic device. The housing 100 may be formed of plastic in some embodiments. According to at least one embodiment, the housing 100 is formed of acrylonitrile butadiene styrene (ABS) plastic or a functionally equivalent plastic material.

The housing 100 may have an external surface 101 and an internal cavity 102 defined therein. The internal cavity 102 may be sized to accommodate modular subassemblies as described herein for assembling a personal electronic device. The external surface 101 may be a cosmetic surface and/or peripheral surface surrounding the internal cavity 102. Furthermore, the external surface 101 may include a plurality of external features 103, 104 defined thereon. The external features 103, 104 may be features for integrating input/output devices or other systems. According to one embodiment, the external features 103, 104 include button features, switch features, charging port features, audio port features, memory slot features, subscriber identity module (SIM) card receiving features, and/or any other feasible features. An upper peripheral edge 107 is defined about the periphery of the internal cavity 102.

Figure 1B:
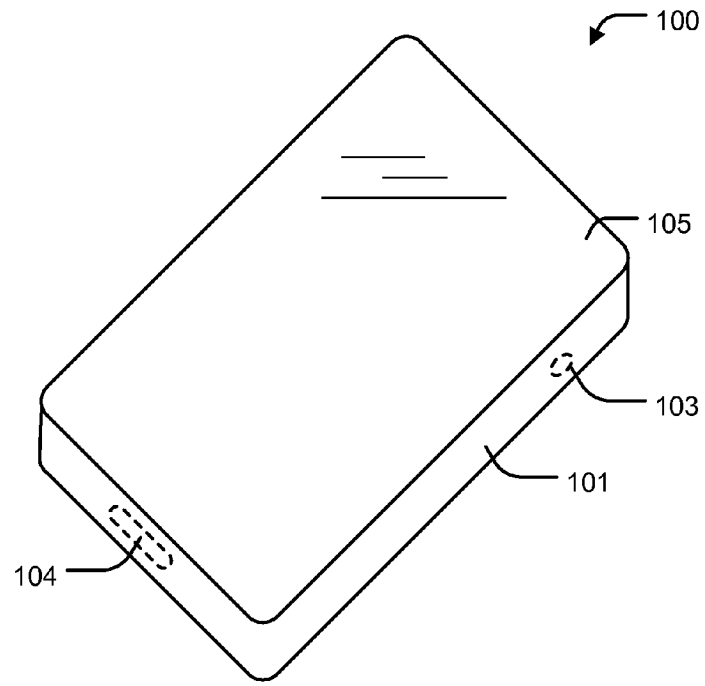
FIG. 1B is an alternate perspective view of the housing of FIG. 1A.

FIG. 1B is an alternate perspective view of the housing 100 of FIG. 1A. As shown, the housing 100 may further include a back surface 105 opposite the internal cavity 102 and the upper edge 107, and adjacent the external surface 101. As further shown, features 103, 104 may exist on any portion of the surfaces of the housing 100.

Figure 2:
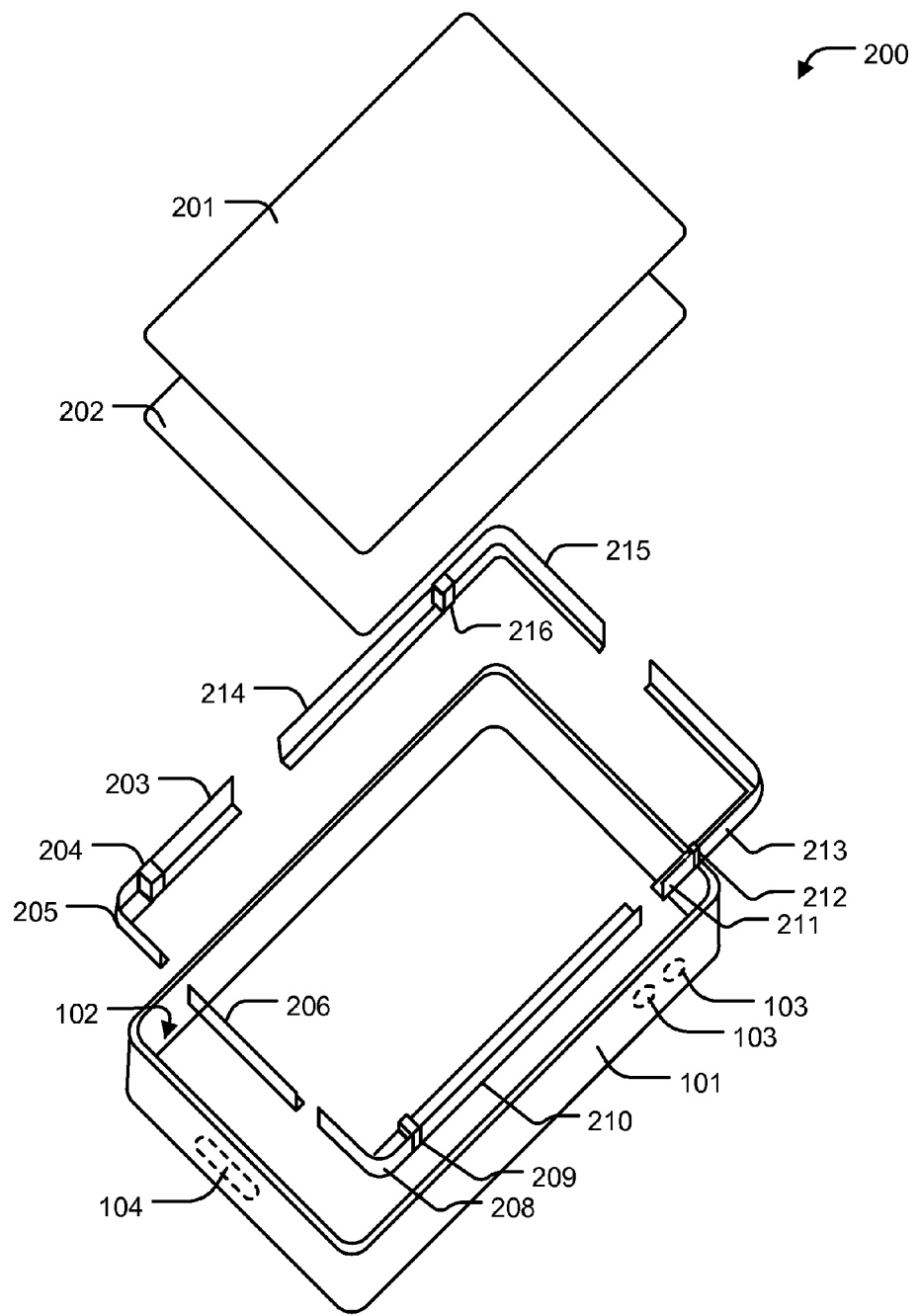
FIG. 2 is an exploded view of modular subassemblies and structural stiffeners of a personal electronic device, according to an exemplary embodiment.

FIG. 2 is an exploded view of modular subassemblies 200 (e.g., a system of modular subassemblies which can take the form of stiffeners) of a personal electronic device, according to an exemplary embodiment. As illustrated, the subassemblies 200 may include a plurality of members arranged to be received within housing 100. The subassemblies 200 may include at least one structural stiffener 214 in one embodiment.

Generally, subassembly 201 may be a chassis arranged to be affixed to an interior surface of the cavity 102. The chassis 201 may be formed of relatively stiff material such as, for example, stainless steel, steel, aluminum, or any other suitable material. The chassis 201 may be substantially planar and/or substantially rectangular. The chassis 201 may also function as a ground plane for an end device. The chassis 201 may be affixed to the housing 100 through an adhesive member 202. The adhesive member 202 may be a pressure sensitive adhesive member in one embodiment.

The modular subassembly 203 may be a side support member arranged to be affixed to an interior surface of the internal cavity 102 opposite the external surface 101. The side support member 203 may be formed of relatively stiff material such as, for example, stainless steel, steel, aluminum, or any other suitable material.

The modular subassembly 205 may be a corner support member arranged to be affixed proximate an internal corner of the internal cavity 102 opposite the external surface 101. The corner support member 205 may be formed of relatively stiff material such as, for example, stainless steel, steel, aluminum, or any other suitable material.

The support members 203, 205 may be joined with a joining member 204. According to one embodiment, the joining member 204 is an insert molded plastic member affixed to both support members 203, 205 and keeping the same a relatively fixed, predetermined distance apart.

The modular subassemblies 200 may further include a spanning member 206 arranged to span between corner support members 205, 208 and align with feature 104. The spanning member is arranged to be affixed to an interior surface of the internal cavity 102 opposite the external surface 101. The corner support member 208 may be relatively similar in function to corner support member 205.

The modular subassemblies 200 may further include side support member 210 arranged to be joined to corner support member 208 through joining member 209. Side support member 210 may be relatively similar in function to support member 203. Furthermore, joining member 209 may be relatively similar to joining member 204.

Generally, members 203-210 may form a bottom portion of the subassemblies 200, and may be arranged to be inserted and affixed to housing 100 after alignment/registration with any associated features 103, 104. As further illustrated, modular subassemblies 200 further include members 211-216 which are arranged to form a top portion of the subassemblies 200, and may be arranged to be inserted and affixed to housing 100 after alignment/registration with any associated features 103, 104. For example, side support member 211 is arranged to be joined with corner support member 213 through joining member 212. Furthermore, corner support member 215 is arranged to be joined with side support member 214 through joining member 216.

It is noted that although a particular number of side support members and corner support members have been illustrated, the same may be varied to include more or less individual members according to any desired implementation of exemplary embodiments. It is further noted that the subassemblies 200 may each be formed of steel, stainless, steel, aluminum, or any other suitable material. Moreover, each subassembly of the subassemblies 200 may be termed a stiffener or structural stiffener. According to at least one embodiment, individual subassemblies of the subassemblies 200 are formed of sheet metal or stainless steel sheet metal.

As noted above, several different corner members may be joined to side support members through joining members. These joining members 204, 209, 212, and 216 may be formed in an insert molding process such that each joining member is an insert molded plastic member affixed to both adjacent support members 203, 205; 208, 210; 211, 213; and 214, 215, respectively, and keeping the same a relatively fixed, predetermined distance apart (e.g., see FIG. 7). The joining members 204, 209, 212, and 216 may be formed of plastic and/or a dielectric.

Figure 3:
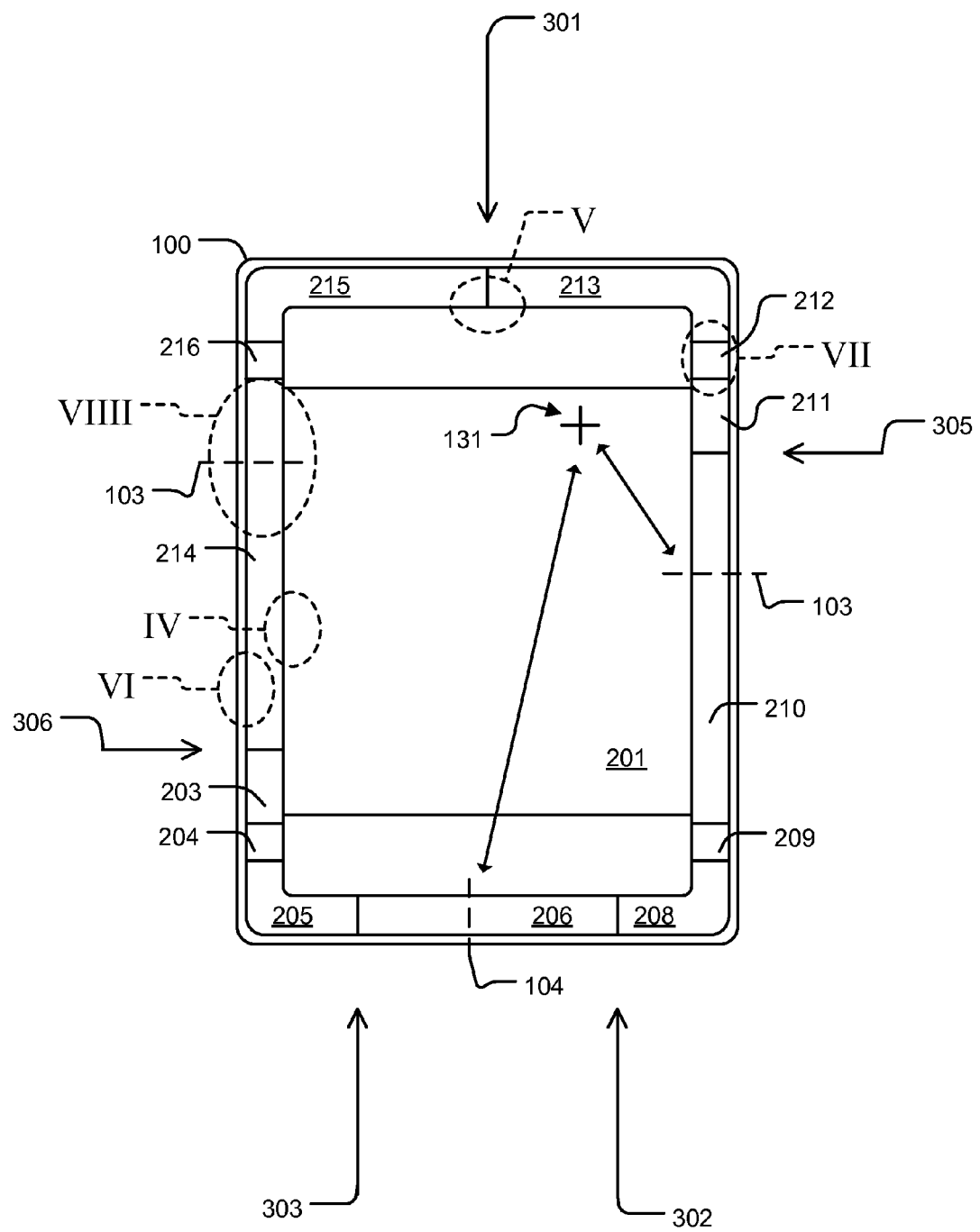
FIG. 3 is a plan view of a housing for a personal electronic device with affixed modular subassemblies and structural stiffeners, according to an exemplary embodiment.

Upon joining, the joined members, the spanning member 206, and the chassis 201 may be aligned/registered and inserted/affixed to the housing 100. For example, FIG. 3 is a plan view of the housing 100 with affixed modular subassemblies 200, according to an exemplary embodiment.

As shown, the joined members 214, 215 may be aligned with associated features 103 and inserted in the housing 100. Furthermore, joined members 208, 210 may be aligned with associated features 103 and inserted in the housing 100. Even further, spanning member 206 may be aligned with associated features 104 and inserted into the housing 100. Moreover, joined members 211, 213 and 203, 205 may be further aligned and inserted in the housing 100. Although not particularly illustrated, it is understood that alignment for these members may be relative to features 103, 104 or according to other features of the housing 100. Therefore, the housing 100 itself acts as an assembly/datum fixture for registering/aligning the subassemblies 200.

Each of the members 203-216 may be affixed to an interior surface of the interior cavity 102 of the housing 100 using, for example, an adhesive or glue. The adhesive or glue may include any suitable adhesive chemistry, including pressure sensitive, heat sensitive, or any other feasible chemistry.

Upon affixing the members 203-216, the chassis 201 may be aligned/registered with the housing 100 and inserted into the same adjacent to internal edges of the members 203-216. Adhesive member 202 is not illustrated here for clarity. For example, one or more optical fiducial markers or other alignment features 131 may be present on the chassis 201. The alignment features 131 may include a coordinate point/axis, screw hole, welded stud, welded nut, pin hole, or any other suitable feature. Using a relative location of the alignment features 131 as compared to features 103, 104 of the housing 100, the chassis 201 may be aligned.

Thereafter, the individual members 201-216 may be fastened to one another, for example, through welding (e.g., laser welding). Fastening joints 301, 302, 303, 305, and 306 are illustrated. According to one embodiment, the fastening joints 301, 302, 303, 305 and 306 comprise lap joints for ease in aligning and registering adjacent members. Furthermore, as shown, joints 305 and 306 are generally out of alignment. This may enhance the structural integrity of an end device. However, according to some embodiments, joints 305 and 306 may generally be aligned. As further shown, spanning member separates joints 302, 303 from a centerline formed at joint 301. This may also enhance the structural integrity of an end device. However, according to some embodiments spanning member 106 may instead be omitted. Hereinafter, expanded, detailed views of the annotated portions of FIG. 3 are described in detail with reference to FIGS. 4-7 and 9.

Figure 4:
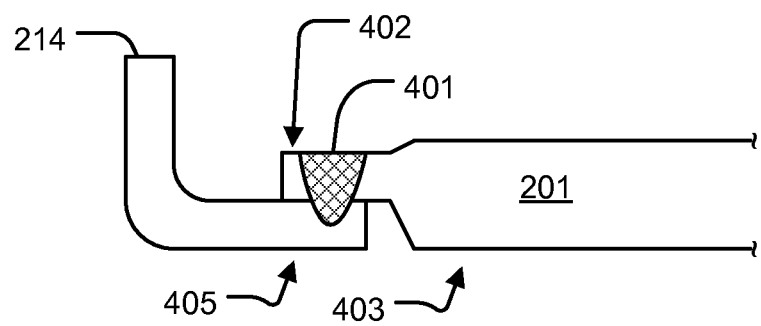
FIG. 4 is an expanded view of a fastening joint of a modular subassembly and structural stiffener, according to an exemplary embodiment.

FIG. 4 is an expanded view of a fastening joint of a modular subassembly, according to an exemplary embodiment. As illustrated, a peripheral edge 402 of the chassis 201 may be welded or otherwise fastened (e.g., through screws, glue, etc.) to an interior edge 405 of an adjacent support member (illustrated as 214). The weld pool 401 may penetrate the edge 402 but not the edge 405 such that the housing 100 is not deformed or damaged. This may be accomplished through modulation or change to a laser intensity and/or duration, or by any other feasible manipulation of a welding system. As further shown, a thickness of an interior portion 403 of the chassis 201 is generally greater than that of the edge 402. Therefore, a good weld may be formed without burning through member 214. It is noted that similar fastening welds may be formed between chassis 201 and members 203, 210, and 211.

Figure 5:
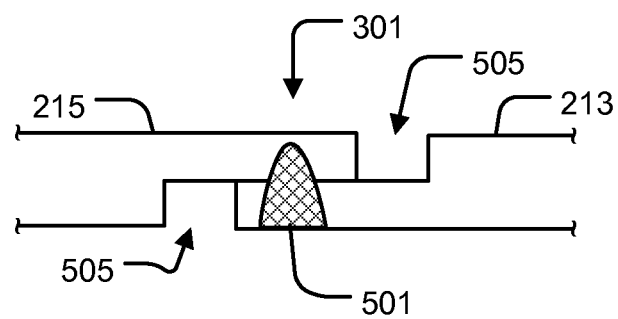
FIG. 5 is an expanded view of a fastening joint of a modular subassembly and structural stiffener, according to an exemplary embodiment.

FIG. 5 is an expanded view of a fastening joint of a modular subassembly, according to an exemplary embodiment. As illustrated, joint 301 (and similarly, joints 302, 303, 305, and 306) is a lap joint allowing for contraction or expansion of areas 505 for appropriate alignment of individual members within the housing 100. Upon proper alignment, the adjacent members may be welded to one another through, for example, laser welding and formation of weld pool 501. As shown, weld pool 501 only fully penetrates an interior portion of the lap joint, thereby avoiding damage to the housing 100.

Figure 6:
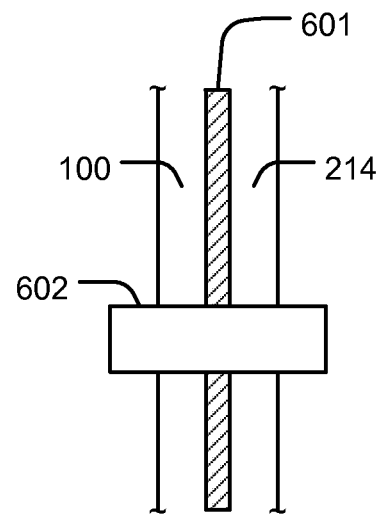
FIG. 6 is an expanded view of an interface between a structural stiffener and housing, according to an exemplary embodiment.

FIG. 6 is an expanded view of an interface between a modular subassembly and housing, according to an exemplary embodiment. As noted above, individual side and corner support members may be adhered to an interior surface of the interior cavity 102 of the housing 100. For example, glue or adhesive 601 may be applied to either or both of the housing 100 and the associated support members (shown as 214). Upon appropriate alignment, a spring loaded clip or biasing member 602 may gently maintain alignment while glue or adhesive 601 is allowed to cure. Upon curing (or upon curing and welding as described above), the biasing member 602 may be removed. It is noted that although only a single biasing member 602 is illustrated, a plurality of separate biasing members 602 may be used in actual implementation, for example, by clipping around a periphery of the housing 100 while glue or adhesive is allowed to cure.

Figure 7:
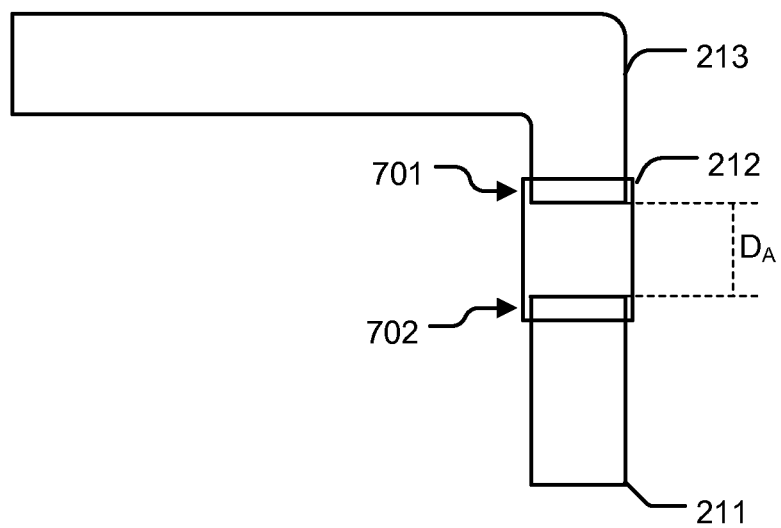
FIG. 7 is an expanded view of an interface between modular subassemblies and structural stiffeners, according to an exemplary embodiment.

As described above with reference to FIG. 2, joining members such as member 212 may be insert molded about two adjacent support members (e.g., a side support and corner support). FIG. 7 is an expanded view of an interface between modular subassemblies, according to an exemplary embodiment. As shown, the joining member 212 is insert molded about corner member 213 and side member 211 and maintains the same at a relatively fixed predetermined distance of $D_A$. The distance $D_A$ may be altered according to any desired implementation. Furthermore, the distance $D_A$ may be changed, minimized, or maximized.

Figure 8:
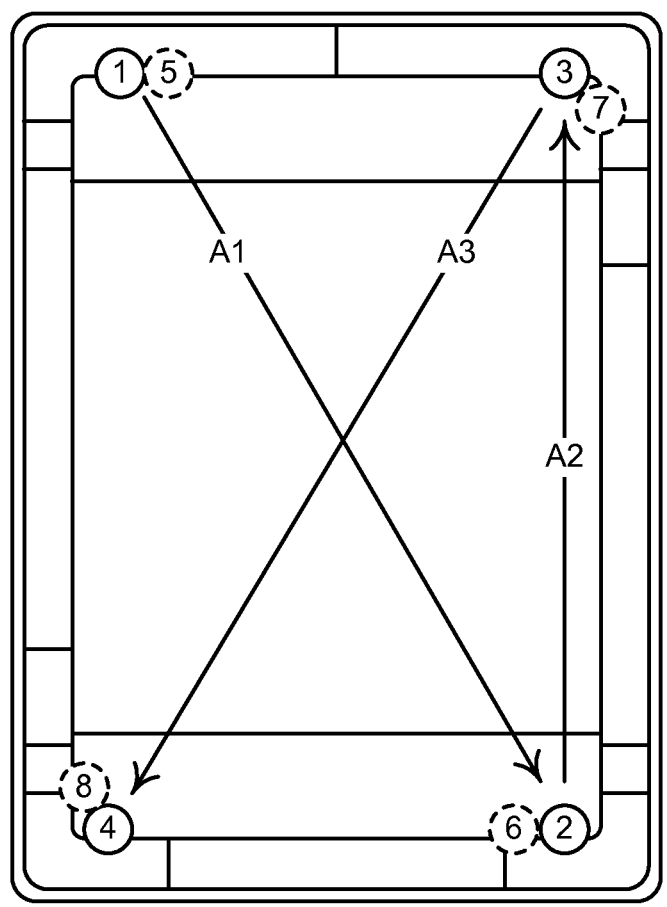
FIG. 8 depicts an example fastening path for fastening modular subassemblies and structural stiffeners, according to an exemplary embodiment.

As described above with reference to FIGS. 4-5, laser welds may be used to fasten adjacent subassembly members in some embodiments. However, welding may provide a significant source of heat which may damage a housing formed of, for example, plastic. FIG. 8 depicts an example fastening path for fastening modular subassemblies, according to an exemplary embodiment. As illustrated in FIG. 8, individual weld joints 1, 2, 3, 4 may be performed in succession at disparate portions of the illustrated structure to reduce localized heat buildup which would otherwise damage and/or warp housing 100. For example, one weld path may follow arrows A1, A2, and A3 in iterative succession in a clockwise manner (continued as joints 5, 6, 7, 8, etc.). The same may be altered or reversed in some embodiments. Still in other embodiments a time delay or other cooling mechanism may be included to reduce localized heat accumulation.

Figure 9A:
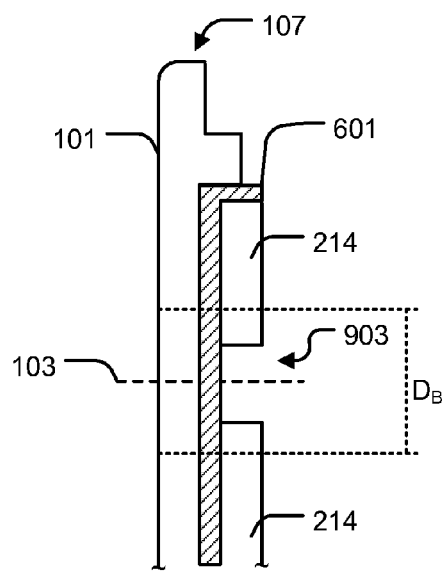
FIG. 9A depicts a cross section of a device housing having an installed structural stiffener, according to an exemplary embodiment.

Upon fastening of the modular subassemblies 200 within the housing 100, the chassis and housing may be co-machined to define apertures proximate the features 103, 104, for example, and to install external features therein. FIG. 9A depicts a cross section of a device housing having an installed structural stiffener, according to an exemplary embodiment. As shown, glue or adhesive 601 is cured and affixes support member 214 adjacent to housing 100 opposite exterior surface 101. Furthermore, an alignment aperture 903 is in alignment with feature 103. Generally, feature 103 may be a predetermined location for installation of an external feature such as, for example, a pushbutton, switch, external port, or the like. An actual external feature may require an installation diameter of $D_B$. Although illustrated as circular, it is understood that the resulting aperture may take any desired shape.

Figure 9B:
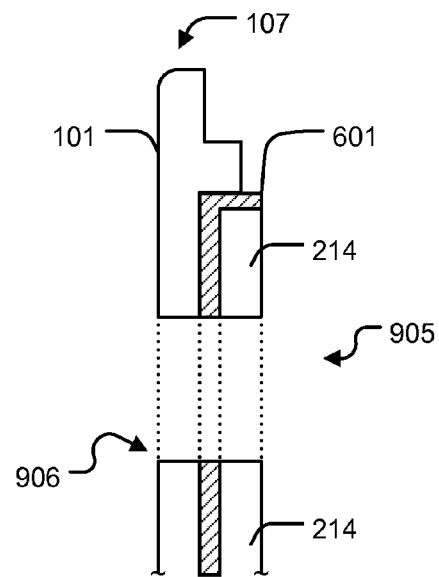
FIG. 9B depicts a cross section of a device housing having a co-machined aperture with a structural stiffener, according to an exemplary embodiment.

FIG. 9B depicts a cross section of the device housing having a co-machined aperture 905, according to an exemplary embodiment. As shown, the aperture 905 has been machined through both the housing 100 and the member 214 such that there is a coaxial aperture (i.e., an aperture in the structural member 214 is coaxial and in registration with an aperture in the housing 100). As such, a well-defined exterior edge region 906 is now present. In order to protect the defined edge 906, finishing may be added.

Figure 9C:
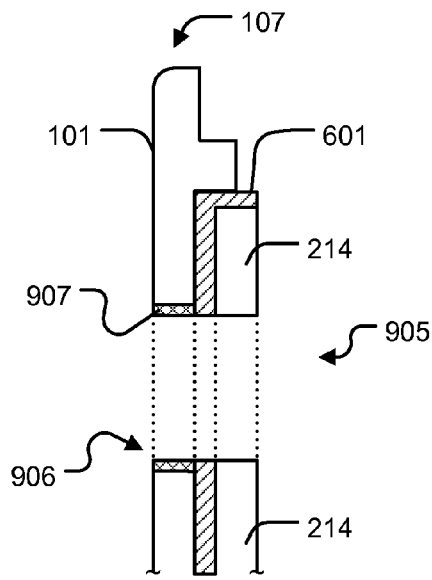
FIGS. 9C-9D depict cross sections of device housings with finished co-machined apertures, according to an exemplary embodiment.
Figure 9D:
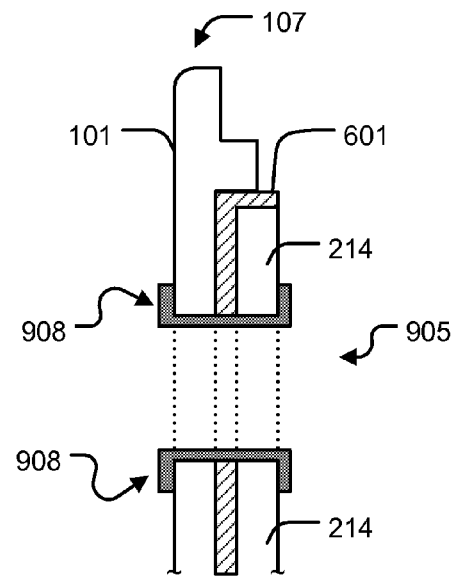

FIGS. 9C-9D depict cross sections of device housings with finished co-machined apertures 905, according to an exemplary embodiment. As shown in FIG. 9C, the edge 906 of the housing 100 may be plated in material 907. For example, because the aperture 905 has been machined, any paint or surface treatments present on an interior surface of the aperture 905 have been removed. Moreover, if the housing 100 is formed of a material which can accept plating (such as ABS plastic), the exposed finished edge 906 may be plated with, for example, metal. In addition to, or instead of, plating from material 907, generally annular trim 908 may be installed about the edge 906 to finish the aperture 905. Generally, plating and/or trim may aid in preventing chemical damage to the machined edge 906.

Figure 9F:
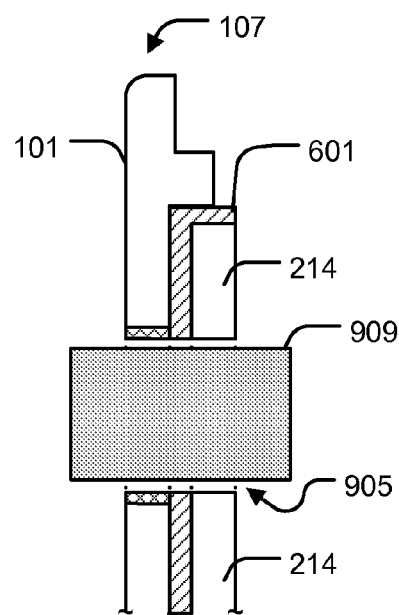
FIGS. 9F-9G depict cross sections of device housings having external features installed in co-machined apertures, according to an exemplary embodiment.
Figure 9G:
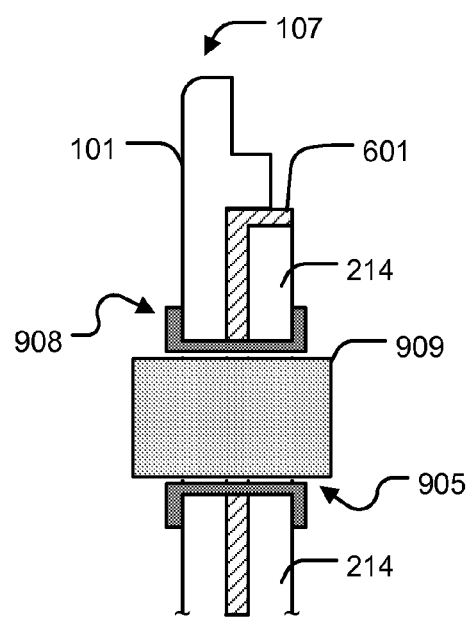

Upon finishing as depicted in FIG. 9C and/or 9D, external features may be installed. FIGS. 9F-9G depict cross sections of device housings having external features 909 installed in co-machined apertures 905, according to an exemplary embodiment. As shown the external features 909 (e.g., buttons, switches, etc.) can be installed within the finished apertures 905 such that a portion of the features can communicate with an exterior of the internal cavity 102, and a portion of the features can communication with an interior of the internal cavity 102. For example, a user may depress an external portion of a button and thereby communicate with electronics interior to the housing 100.

Figure 10:
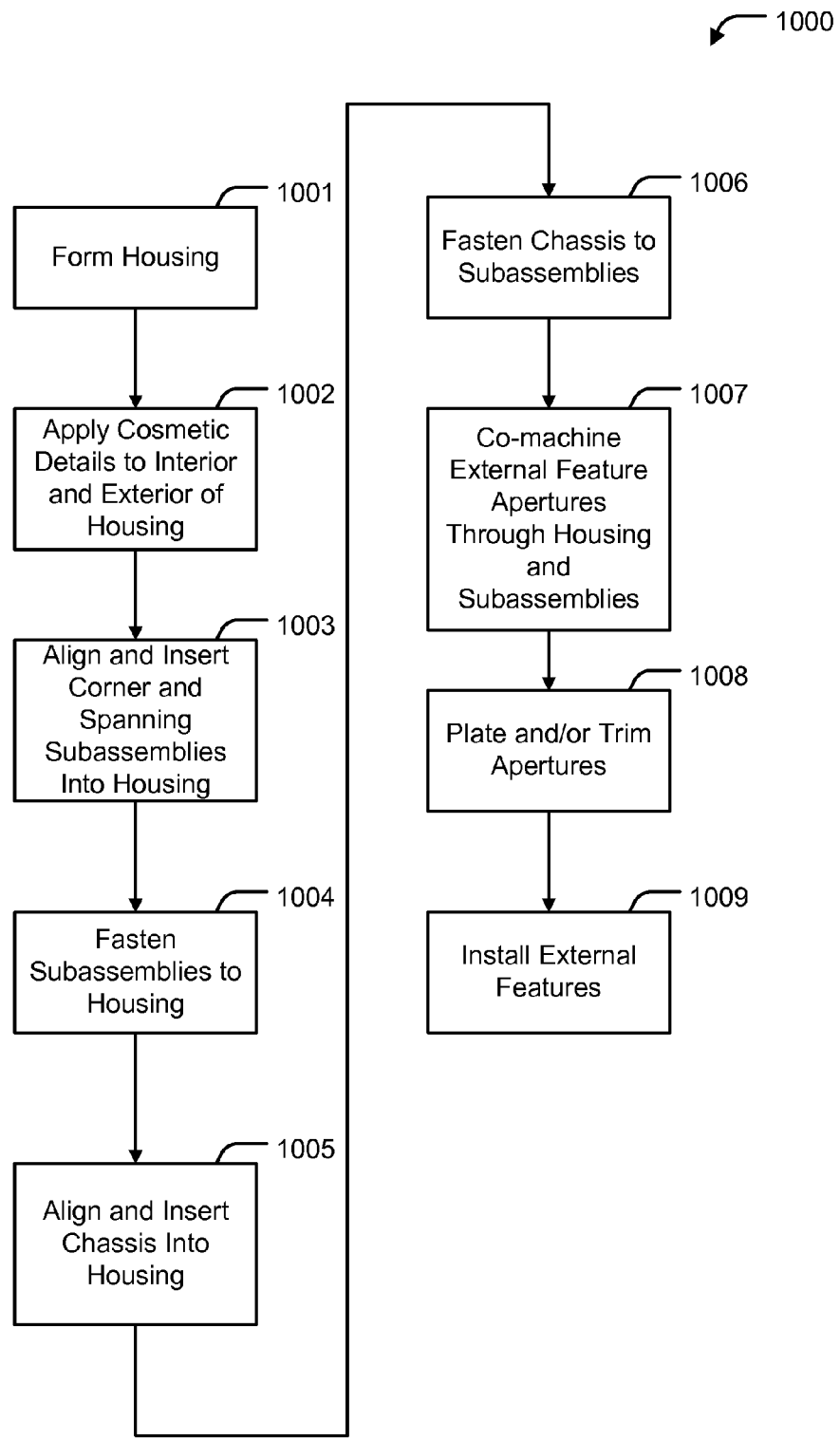
FIG. 10 is a flowchart of a method of assembling a personal electronic device, according to an exemplary embodiment.

FIG. 10 is a flowchart of a method 1000 of assembling a personal electronic device, according to an exemplary embodiment. The method 1000 includes forming a housing at step 1001. The forming may include molding or otherwise forming a housing (e.g., 100) from plastic. The housing may be painted, decorated, polished, and/or sealed with a clear coat in some embodiments.

Thereafter, the method 1000 includes applying cosmetic details to the interior and exterior of the housing at step 1002. For example, paint, sealants, and other cosmetic finishing details may be applied. Thereafter, the method 1000 includes aligning and inserting corner and spanning subassemblies into the housing at step 1003. The aligning and inserting may be performed as described above.

Thereafter, the method 1000 includes fastening subassemblies into the housing at step 1004. For example, spring loaded clips or biasing members may be used to hold the inserted subassemblies until an adhesive or glue cures. Thereafter, or at substantially the same time, the chassis may be aligned and inserted into the housing at step 1005.

The chassis and subassemblies may then be fastened to one another at step 1006, for example, through laser welding, screws, bolts, adhesives, or any suitable manner of fastening. If welding, the welding process may be adjusted to reduce or minimize accumulation of heat proximate the housing. In this manner, distortion and damage to the housing may be minimized. After fastening, the chassis and housing may be populated with device components such as, for example, input/output interfaces, logic boards, power supplies/batteries, transceiver circuitry, and/or other suitable components.

Upon fastening of the internal support members, the external feature apertures may be co-machined through the housing and installed support members at step 1007. Thereafter, the defined apertures may be plated and/or trimmed at step 1008. Finally, external features such as switches, pushbuttons, ports, and the like may be installed in the finished apertures.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data, which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A housing assembly for a portable electronic device, comprising:
 a housing having a bottom wall and sidewalls that define an internal cavity corresponding to a size and a shape of the portable electronic device, the housing further comprising a front opening;
 a first structural member comprising a first corner support joined with a first spanning member by a first joining member;
 a second structural member comprising a second corner support joined with a second spanning member by a second joining member; and
 an aperture passing through one of the sidewalls and one of the first structural member and the second structural member;
 wherein the first structural member and the second structural member are permanently linked together by a joining member and arranged within the internal cavity to form an internal structure that reinforces the walls of the housing, and
 wherein the first structural member and the second structural member are coupled with an interior surface of at least one of the sidewalls of the housing.

2. The housing assembly as recited in claim 1, further comprising:
 a chassis substantially covering an interior surface of the bottom wall of the housing, wherein a peripheral portion of the chassis is joined with at least one structural member disposed on each of two opposing sidewalls of the housing.

3. The housing assembly as recited in claim 2, wherein the chassis is joined to at least one of the first structural member and the second structural member by at least one weld.

4. The housing assembly as recited in claim 2, wherein the chassis is a flat piece of sheet metal that extends from a first sidewall to a second sidewall opposite the first sidewall.

5. The housing assembly as recited in claim 4, wherein the chassis is operative as a ground plane for the portable electronic device.

6. The housing assembly as recited in claim 1, wherein the housing comprises plastic and wherein the first structural member and the second structural member comprise a metal.

7. The housing assembly as recited in claim 1, further comprising:
 an aperture passing through both the housing and the first structural member, wherein the aperture includes a first opening in the housing and a second opening in the first structural member, the second opening aligned and concentric with respect to the first opening.

8. The housing assembly as recited in claim 7, wherein an interior surface of the aperture comprises a metal plate and an annular trim, wherein the metal plate is disposed along the interior surface, and wherein the annular trim extends from one of the sidewalls to the first structural member.

9. The housing assembly as recited in claim 7, wherein the aperture has a size and shape in accordance with one of a button, a switch and a port associated with the portable electronic device.

10. The housing assembly as recited in claim 1, wherein the joining member comprises a plastic molded to the first structural member and the second structural member.

11. A portable electronic device, comprising:
 a housing formed from an opaque material and having a bottom wall and sidewalls that cooperate to define an internal cavity;
 a plurality of structural members disposed within the internal cavity, each of the plurality of structural members adhered to an interior surface of at least one of the sidewalls and to adjacent ones of the plurality of structural members by adjustable joints, the plurality of structural members arranged to form an internal frame in cooperation with the adjustable joints that reinforces the walls of the flexible housing; and
 a substantially planar chassis having a peripheral edge region coupled to at least two of the plurality of structural members, the substantially planar chassis operative to increase a rigidity of the internal frame.

12. The portable electronic device as recited in claim 11, wherein the internal frame formed by the plurality of structural members and the adjustable joints form a ring disposed continuously around an interior surface of the sidewalls.

13. The portable electronic device as recited in claim 11, further comprising an aperture defined by one of the sidewalls and one of the structural members, the aperture having a size and shape in accordance with a user interface of the portable electronic device.

14. The portable electronic device as recited in claim 11, further comprising:
 an aperture extending through the flexible housing and one of the plurality of structural members; and
 a button extending through the aperture, wherein the flexible housing comprises an opaque material and is free of openings other than the aperture.

15. The portable electronic device as recited in claim 11, wherein the opaque material comprises a plastic.

16. A portable electronic device, comprising:
 a flexible housing having a bottom wall and sidewalls that cooperate to define an internal cavity;
 a modular frame member that reinforces the bottom wall and the sidewalls, the modular frame member comprising:
  a plurality of structural members disposed within the internal cavity, each of the plurality of structural members adhered to an interior surface of at least one of the sidewalls, and
  a plurality of adjustable joints that join adjacent ones of the plurality of structural members, the plurality of adjustable joints and the plurality of structural members cooperating to form the modular frame member, wherein the plurality of structural members comprises a plurality of corner support members and a plurality of side support members; and
 a substantially planar chassis having a peripheral edge region coupled to at least two of the plurality of structural members, the substantially planar chassis operative to increase a rigidity of the modular frame member, wherein the corner support members are adhesively coupled with interior surfaces of at least two of the sidewalls.

17. The portable electronic device as recited in claim 16, wherein the modular frame member forms a ring that extends continuously around interior surfaces of each of the sidewalls wherein at least one of the plurality of adjustable joints is insert molded about two adjacent ones of the plurality of structural members.

18. The portable electronic device as recited in claim 16, wherein the substantially planar chassis is coupled to a first structural member of the plurality of structural members by a weld at a point where the substantially planar chassis overlaps a portion of the first structural member.

19. The portable electronic device as recited in claim 16, wherein a central region of the substantially planar chassis is adhesively coupled with an interior surface of the bottom wall of the flexible housing.

20. The portable electronic device as recited in claim 19, further comprising a metal plated interior surface defining an aperture disposed through the flexible housing and one of the structural members and a button disposed through the aperture.

\* \* \* \* \*